(12) United States Patent
Taniguchi

(10) Patent No.: US 6,674,771 B1
(45) Date of Patent: Jan. 6, 2004

(54) TRANSMISSION METHOD AND APPARATUS FOR TRANSMITTING LOW-SPEED SDH SIGNALS USING A HIGH-SPEED SDH FRAME

(75) Inventor: Atsuki Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/450,062

(22) Filed: Nov. 29, 1999

(30) Foreign Application Priority Data

Mar. 18, 1999 (JP) .......................................... 11-073627

(51) Int. Cl.⁷ .............................. H04J 3/07; H04J 3/02
(52) U.S. Cl. ....................... 370/505; 370/535; 370/537; 370/540; 370/541; 370/907
(58) Field of Search ................................ 370/470–476, 370/482, 503–506, 509, 514, 535, 537, 539, 540, 541, 542, 544, 906, 907, 389, 392, 393

(56) References Cited

U.S. PATENT DOCUMENTS

| | | | |
|---|---|---|---|
| 5,727,036 A | | 3/1998 | Maertens |
| 5,734,429 A | | 3/1998 | Jung |
| 6,169,754 B1 | * | 1/2001 | Sugawara et al. .......... 370/535 |
| 6,201,788 B1 | * | 3/2001 | Ishiwatari ................... 370/228 |
| 6,298,038 B1 | * | 10/2001 | Martin et al. ............... 370/216 |

FOREIGN PATENT DOCUMENTS

| | | |
|---|---|---|
| DE | 4018687 | 1/1991 |
| EP | 0 874 488 | 10/1998 |
| EP | 0 966 122 | 12/1999 |
| JP | 09-321729 | 12/1997 |

OTHER PUBLICATIONS

Othmar Kyas, ATM networks, 1995, Internation Thomson Publishing, pp 88–104.*

* cited by examiner

*Primary Examiner*—Steven Nguyen
*Assistant Examiner*—Thomas E. Volper
(74) *Attorney, Agent, or Firm*—Katten Muchin Zavis Rosenman

(57) ABSTRACT

In a transmission method and apparatus, low-speed SDH signals are multiplexed into a high-speed SDH frame, the high-speed SDH frame including at least an information payload, a line overhead and a section overhead, the section overhead being divided into a first section overhead SOH and a second section overhead SOH, the first SOH carrying regenerator SOH bytes and the second SOH carrying multiplex SOH bytes. The multiplex SOH bytes in the second SOH of the high-speed SDH frame are detected without changing the line overhead and the payload when the high-speed SDH frame reaches a receive-side high-level line terminating equipment. The multiplex SOH bytes in the second SOH of the high-speed SDH frame are generated without changing the line overhead and the payload before the high-speed SDH frame is transmitted by a transmit-side high-level line terminating equipment.

8 Claims, 14 Drawing Sheets

FIG. 8A

[POINTER VALUE: 0 - 782 (10 BITS)]

| 522 | 608 |
|-----|-----|
| 609 | 695 |
| 696 | 782 |
| 0 | 86 |
| 87 | 173 |
| 174 | 260 |
| 261 | 347 |
| 348 | 434 |
| 435 | 521 |

STS-1 (NORMAL)
INITIAL POINTER VALUE=522

FIG. 8B

[POINTER VALUE: 0 - 9611 (14 BITS)]

| 7524 | 8567 |
|------|------|
| 8568 | 9611 |
| 0    | 1043 |
| 1044 | 2123 |
| 2124 | 3203 |
| 3204 | 4283 |
| 5364 | 5363 |
| 6444 | 6443 |
| 7524 | 7523 |

STS-12 (TRANSPARENT TRANSPORT)
INITIAL POINTER VALUE=7524

FIG. 11

| 10G LINE CHANNELS | GR-1230 STANDARD | INVENTION | REMARKS |
|---|---|---|---|
| ch. 1~24 | WORK | WORK | |
| ch. 25~48 | WORK | PTCT | |
| ch. 49~72 | WORK | WORK | |
| ch. 73~96 | WORK | PTCT | |
| ch. 97~120 | PTCT | WORK | |
| ch. 121~144 | PTCT | PTCT | |
| ch. 145~168 | PTCT | WORK | |
| ch. 169~192 | PTCT | PTCT | |

TRANSMISSION METHOD AND APPARATUS FOR TRANSMITTING LOW-SPEED SDH SIGNALS USING A HIGH-SPEED SDH FRAME

BACKGROUND OF THE INVENTION (1) Field of the Invention

The present invention relates to a transmission method and apparatus which transmits low-speed SDH (synchronous digital hierarchy) signals using a high-speed SDH frame.

(2) Description of the Related Art

In order to exploit the immense bandwidth available for transmission in an optical fiber, research in wavelength-division multiplexing (WDM) technology is driven. However, the bandwidth utilized by the WDM cannot be directly utilized by time-division multiplexed (TDM) systems due to the speed limitations posed by fiber dispersion. The WDM offers a practical solution of multiplexing many high-speed channels at different optical carrier frequencies and transmitting them over the same fiber. WDM systems are beginning to be deployed more widely in the field and are expected to play a greater role in the near future.

There has been rapid advances in the Internet technology in recent years. The demand for increasing the per-fiber transmission capacity of telecommunications networks continues to grow and the need for economical capacity upgrades becomes compelling. The existing TDM systems are not suitable to meet the higher-capacity demand due to the speed limitations. The WDM systems offer a practical solution of increasing the network transmission capacity and are suited for supporting the high-capacity demand. Recent developments of add-drop multiplexers and digital cross-connect systems have made possible a tremendous increase in the per-fiber transmission capacity.

However, there are at least two problems which relate to the WDM technology. The first is that the dispersion shifted fiber (DSF), widely deployed in the field, is generally suitable for long-haul transmissions of high-speed signals but is not suited for the WDM systems. For this reason, when deploying the DSF, a high-speed TDM system is needed. The second problem of the WDM technology is that the WDM technology offers a bit-rate-free transmission but the efficiency of transmission attained by the WDM is higher when many high-speed signals (e.g., 10 Gbps) are transmitted than when low-speed signals (e.g., 2.4 Gbps) in the same number are transmitted. In order to meet the high-capacity demand, the higher transmission efficiency is preferred.

By taking account of the above-mentioned matters, currently available upgrade options are: use of higher speed electrically-multiplexed systems; use of additional fibers; and use of wavelength multiplexing. Although a mix of three approaches will most likely be used in different parts of the network depending on the need and the economics, a transmission technology which utilizes high-speed electrically-multiplexed systems that operate in a transparent manner similar to the WDM systems is especially attractive. Since cost saving is made possible through fiber and amplifier sharing, the demand for such a technology becomes more compelling.

FIG. 13 shows a configuration of high-speed WDM systems which are connected to low-speed electrically-multiplexed systems via working and protection optical-fiber cables.

In the configuration of FIG. 13, reference numerals 1(1) through 1(4) denote 2.4-Gbps electrically-multiplexed systems which includes four working channels #1 through #4 and one protection channel, both having a data rate of 2.4 Gbps. Reference numerals 2(1) through 2(5) denote high-speed WDM systems which use the wavelength multiplexing. Various optical-fiber cables accommodating the working and protection channels are connected between the 2.4-Gbps systems and the WDM systems. For example, an optical signal sent from one (the working channel #1) of the working channels #1–#4 of the 2.4-Gbps system 1(1) reaches the WDM system 2(1), and the WDM system 2(1) outputs a wavelength-multiplexed optical signal. Optical signals sent from the protection channels of the 2.4-Gbps systems 1(1) and 1(4) reach the WDM system 2(5), and the WDM system 2(5) outputs a wavelength-multiplexed signal.

The WDM configuration of FIG. 13 offers a bit-rate-free transmission and makes the signal processing simple. When a failure of any of the WDM systems 2(1) through 2(4) occurs, the faulty WDM system is substituted for by the WDM system 2(5) by suitably switching the optical-fiber cables.

In the WDM systems 2(1) through 2(5) of FIG. 13, the failure recover capability of 1 protection channel to 4 working channels is provided since all the optical signals of the working channels #1–#4 and the protection channel are transported to these WDM systems.

FIG. 14 shows a configuration of a high-speed electrically-multiplexed system which is connected to a low-speed electrically-multiplexed system.

In the configuration of FIG. 14, reference numerals 1 denote 2.4-Gbps electrically-multiplexed systems which include four working channels #1 through #4 and one protection channel, both having a data rate of 2.4 Gbps. The two low-speed systems 1 are connected by an optical-fiber cable containing the working channels #1 through #4 and the protection channel. Reference numeral 3 denotes a 10-Gbps electrically-multiplexed system which has a data rate of 10 Gbps. In the high-speed system 3, the four 2.4-Gbps signals sent by the low-speed system 1 are electrically multiplexed into a 10-Gbps high-speed signal, and then the high-speed multiplexed signal is converted into an optical signal. The high-speed system 3 transmits the optical signal on a first optical-fiber cable as the working channel, and regenerates an optical signal on a second optical-fiber cable as the protection channel.

In the high-speed electrically-multiplexed system 3 of FIG. 14, only the failure recover capability of 1 protection channel to 1 working channel can be provided since the low-speed signals of the working channels #1–#4 sent by the low-speed system 1 are terminated at the input of the system 3.

In the configuration of FIG. 14, the low-speed system 1 which includes the four working channels #1 through #4 and one protection channel has a failure recovery capability of 80%, but the high-speed system 3 has only the failure recovery capability of 50%. That is, there is a problem in that the use of the high-speed electrically-multiplexed system 3 will lower the failure recovery capability. Further, when the vender of the low-speed systems 1 is different from the vendor of the high-speed system 3, the configuration of FIG. 14 does not necessarily assure the compatibility between the low-speed systems 1 and the high-speed system 3.

By taking account of the above-mentioned matters, the demand for a transmission technology which utilizes high-speed electrically-multiplexed systems that operate in a transparent manner similar to the WDM systems becomes more compelling than before.

The fundamental concept to meet the above-mentioned demand for the WDM-like transmission technology is that four low-speed signals are simply multiplexed into a high-speed signal at a transmit-side network element and the high-speed signal is demultiplexed at a receive-side network element. For example, FIG. 12 shows a multiplexing of four 2.4-Gbps signals into a 10-Gbps signal and demultiplexing of the 10-Gbps signal.

As shown in FIG. 12, a parallel-to-serial conversion (P/S) of 4 inputs to 1 output is provided at a transmit-side network element to multiplex the 2.4-Gbps signals #1 through #4 of the four channels into a 10-Gbps signal. This 10-Gbps signal is serially transported on an optical-fiber cable to a receive-side network element. A serial-to-parallel conversion (S/P) of 1 input to 4 outputs is provided at the receive-side network element to demultiplex the 10-Gbps signal into the reconstructed 2.4-Gbps signals #1 through #4.

The correspondence between the reconstructed low-speed signals and their channels is unknown to the receive side of the network, and it is necessary that the number of channel for each of the input 2.4-Gbps signals is carried on the overhead of the 10-Gbps signal before the transmission. On the receive side of the network, the frame synchronization is performed for a single channel of the low-speed signals reconstructed at the output of the S/P conversion with respect to a corresponding one of the known channel numbers. The channel number of the reconstructed low-speed signal of each channel is detected in this manner, and the channel allocation is controlled based on the detected channel number. The concept of the multiplexing method of FIG. 12 is analogous to the initial concept of the multiplexing method of the SONET. See TA-TSY-00253, Issue 2 published by Bellcore.

The above-mentioned demand for the WDM-like transmission technology can be met by using the P/S and the S/P conversion as shown in FIG. 12. However, there are at least two problems with the multiplexing method of FIG. 12.

The first problem is that the simple multiplexing of four 2.4-Gbps signals into a 10-Gbps signal does not assure the high-speed line error monitoring. In a case of the WDM systems, the high-speed line error monitoring must be performed by using an optical power monitoring device or an optical spectrum-analyzer.

In a case of the electrically-multiplexed systems, the high-speed line error monitoring must be performed at the 10-Gbps systems by detecting the B1 byte (bit interleaved parity code) in the section overhead of a STS-N frame or a STM-N frame. Further, accessing the SDCC (section data communications channels) bytes in the section overhead of the high-speed SDH frame by the 10-Gbps systems is required to make it possible to remote control the optical transmission network elements by a control unit such as a workstation. For these reasons, it is difficult for the conventional systems to assure the high-speed line error monitoring when transmitting the low-speed SDH signals by using a high-speed SDH frame.

The second problem of the multiplexing method of FIG. 12, is that the simple multiplexing of four 2.4-Gbps signals into a 10-Gbps signal does not directly assure the clock error adjusting. When a significant clock error between the incoming clock and the outgoing clock exists at the 10-Gbps systems, the clock error adjusting must be performed before transmitting the high-speed SDH frame.

For example, FIG. 15 shows an optical transmission ring network in which high-speed transmission systems and a low-speed transmission system coexist. In this ring network, the 10-Gbps signal is transported on a main optical-fiber cable between the 10-Gbps systems. If the demand for transmitting 2.4-Gbps low-speed signals in a portion of the ring network by using the 10-Gbps high-speed signal occurs, the exact synchronization between the clock of the 10-Gbps systems and the clock of the 2.4-Gbps systems is not necessarily assured by simply placing the existing 2.4-Gbps low-speed systems in the network portion.

The above demand may frequently occur when it is desired to upgrade the existing 2.4-Gbps systems of a vendor to the 10-Gbps systems of a different vendor simultaneously with the upgrading from the existing 2.4-Gbps optical-fiber cables to 10-Gbps optical-fiber cables.

In the SONET (synchronous optical network), a clock frequency error of ±20 ppm between the incoming clock and the outgoing clock at a network element is allowed, and the AU (administration unit) pointers (the H1, H2 and H3 bytes) of the SONET frame are used to compensate for the possible frequency difference between the incoming clock and the outgoing clock. However, the AU pointers are located in the line overhead of the SONET frame not in the section overhead thereof, and the use of the AU pointers does not directly assure the high-speed line error monitoring nor the clock error adjusting.

Accordingly, it is difficult for the conventional systems to assure the clock error adjusting and the high-speed line error monitoring when transmitting the low-speed SDH signals by using a high-speed SDH frame.

SUMMARY OF THE INVENTION

An object of the present invention is to provide an improved SDH signal transmission method and apparatus in which the above-mentioned problems are eliminated.

Another object of the present invention is to provide a transmission method which executes the transmission of low-speed SDH signals using a high-speed SDH frame and ensures the clock error adjusting and the high-speed line error monitoring.

Another object of the present invention is to provide a transmission apparatus which executes the transmission of low-speed SDH signals using a high-speed SDH frame and ensures the clock error adjusting and the high-speed line error monitoring.

The above-mentioned objects of the present invention are achieved by a transmission method which transmits low-speed SDH signals using a high-speed SDH frame, the transmission method including the steps of: multiplexing the low-speed SDH signals into the high-speed SDH frame, the high-speed SDH frame including an information payload, a line overhead and a section overhead, the section overhead being divided into a first section overhead SOH and a second section overhead SOH, the first SOH carrying regenerator SOH bytes and the second SOH carrying multiplex SOH bytes; detecting the multiplex SOH bytes in the second SOH of the high-speed SDH frame without changing the line overhead and the payload when the high-speed SDH frame reaches a receive-side high-level line terminating equipment; and generating the multiplex SOH bytes in the second SOH of the high-speed SDH frame without changing the line overhead and the payload before the high-speed SDH frame is transmitted by a transmit-side high-level line terminating equipment.

The above-mentioned objects of the present invention are achieved by a transmission apparatus which transmits low-speed SDH signals using a high-speed SDH frame, the transmission apparatus including: a multiplexer which multiplexes the low-speed SDH signals into the high-speed SDH frame, the high-speed SDH frame including an information payload, a line overhead and a section overhead, the section overhead being divided into a first section overhead SOH and a second section overhead SOH, the first SOH carrying regenerator SOH bytes and the second SOH carrying multiplex SOH bytes; a multiplex SOH detecting unit which detects the multiplex SOH bytes in the second SOH of the high-speed SDH frame without changing the line overhead and the payload when the high-speed SDH frame reaches the transmission apparatus; and a multiplex SOH generating unit which generates the multiplex SOH bytes in the second SOH of the high-speed SDH frame without changing the line overhead and the payload before the high-speed SDH frame is transmitted by the transmission apparatus.

In the transmission method and apparatus according to the present invention, the multiplex SOH bytes in the high-speed SDH frame are created and used by the high-speed line terminating equipment for clock error adjusting, high-speed line error monitoring, and high-speed line level equipment communications. The transmission method and apparatus of the present invention is effective in assuring the clock error adjusting and the high-speed line error monitoring when transmitting the low-speed SDH signals by using the high-speed SDH frame.

BRIEF DESCRIPTION OF THE DRAWINGS

Other objects, features and advantages of the present invention will be more apparent from the following detailed description when read in conjunction with the accompanying drawings in which:

FIG. 8A and FIG. 8B are diagrams for explaining a normal pointer value setting of the conventional SONET system and a pointer value setting of the transparent-transport SONET system of the present embodiment;

FIG. 11 is a diagram for explaining a modified allocation of working and protection channels in an optical-fiber cable of the transparent-transport SONET system of the present embodiment;

DETAILED DESCRIPTION OF THE PREFERRED EMBODIMENTS

A description will now be given of the preferred embodiments of the present invention with reference to the accompanying drawings.

The SDH (synchronous digital hierarchy) is a set of international digital transmission standards. The SDH is the international version of the SONET (synchronous optical network), which is used in North America. The fundamental principles of the SONET apply directly to the SDH. The two major differences between SDH and SONET are the terminology and the basic date rates used. For example, the SONET uses a basic data rate of 51.84 Mbps, and the SDH uses a basic data rate of 155.52 Mbps, which is exactly three times the SONET basic data rate.

Hereinafter, the SONET specification is used as being in conformity with the SDH specification. The SONET specification defines a hierarchy of standardized digital data rates. The lowest level in the SONET, referred to as STS-1 (synchronous transport signal level 1), is 51.84 Mbps. Multiple STS-1 signals can be combined to a form an STS-N signal. This signal is created by interleaving bytes from "N" STS-1 signals that are mutually synchronized. According to the transmission method and apparatus of the present invention, if the STS-12 frame (622 Mbps) or the STS-48 frame (2.4 Gbps) is considered a low-speed SDH signal, the STS-192 frame (10 Gbps) is considered a high-speed SDH frame. If the STS-1 frame or the STS-4 frame is considered the low-speed SDH signal, the STS-12 frame is considered the high-speed SDH frame.

Figure 1:
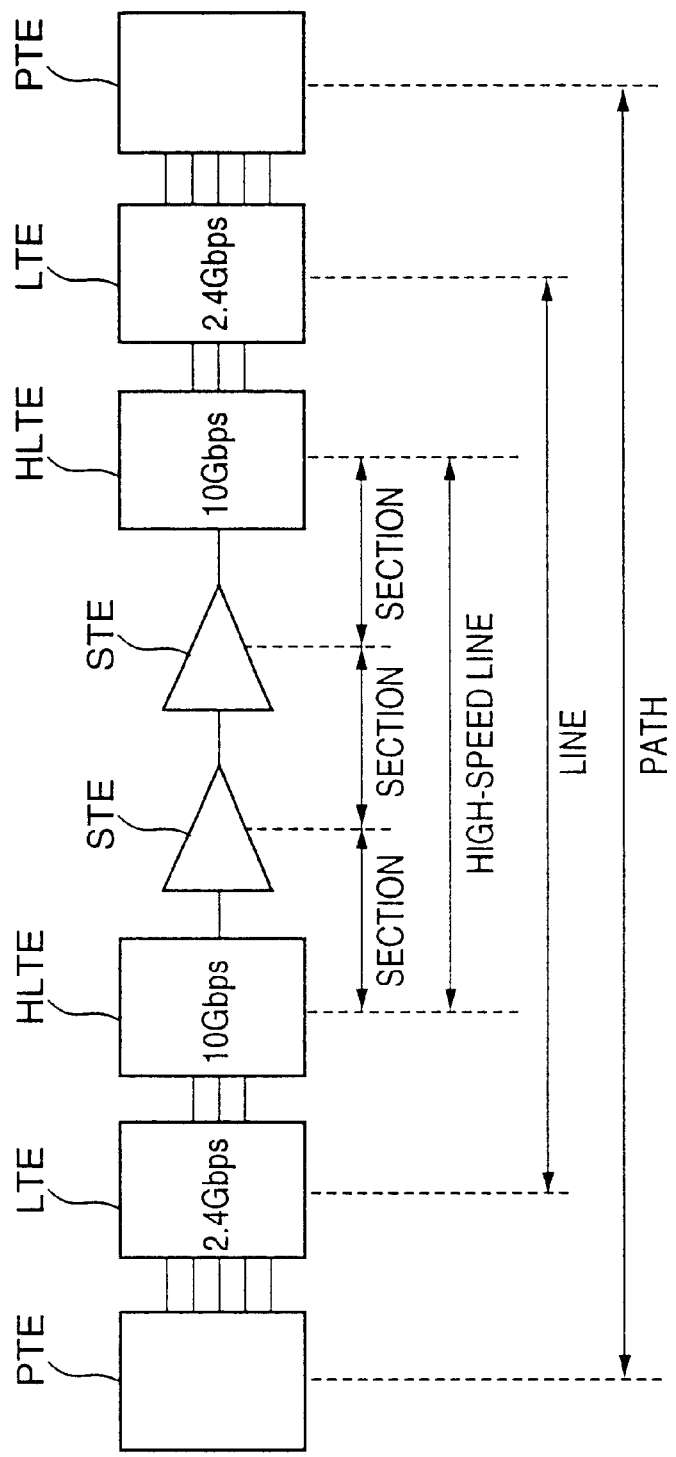
FIG. 1 is a block diagram of a transparent-transport SONET system to which an embodiment of the present invention is applied.

FIG. 1 shows a transparent-transport SONET system to which an embodiment of the present invention is applied. In FIG. 1, PTE denotes path terminating equipment, LTE denotes line terminating equipment, HLTE denotes a high-speed line terminating equipment according to the invention, and STE denotes section terminating equipment. For example, the LTE in the transparent-transport SONET system of FIG. 1 corresponds to a low-speed transmission apparatus having a data rate of 2.4 Gbps, and the HLTE in the transparent-transport SONET system of FIG. 1 corresponds to a high-speed transmission apparatus having a data rate of 10 Gbps, which is related to the present invention.

Figure 2:
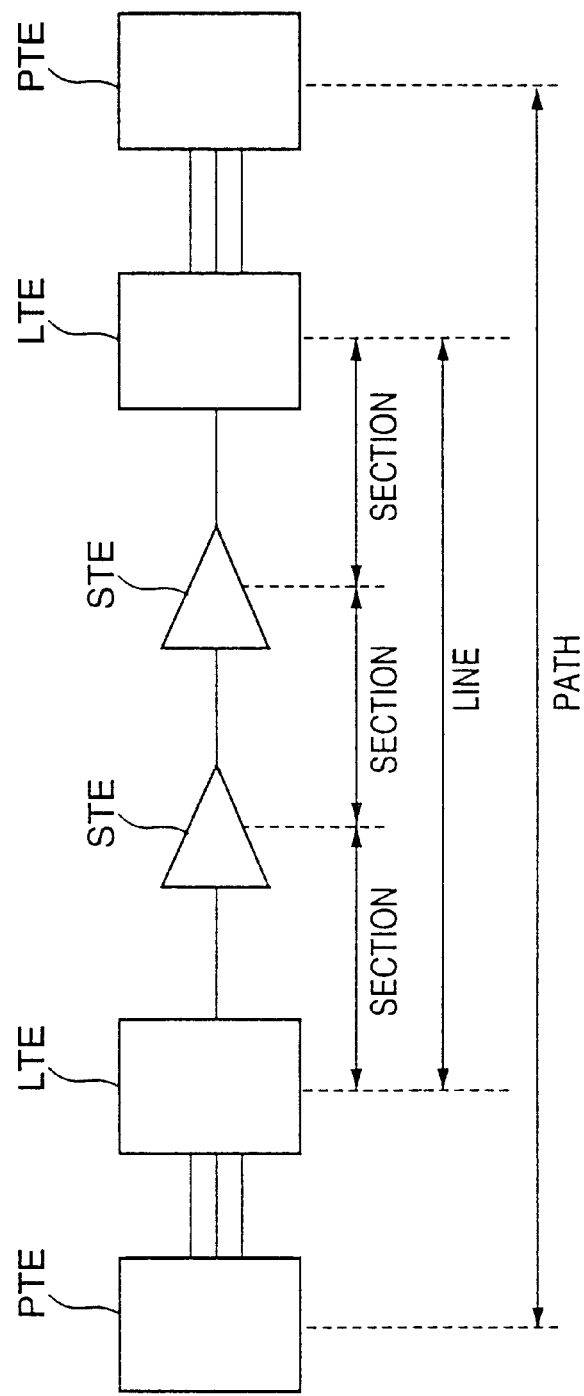
FIG. 2 is a block diagram of a conventional SONET system.

FIG. 2 shows a conventional SONET system for the purpose of comparison with the transparent-transport SONET system of the present embodiment. In FIG. 2, the designation of reference characters, such as PTE or LTE, which is the same as that of FIG. 1, is used. As shown in FIG. 2, the SONET capabilities in the conventional SONET system are mapped into a three-layer hierarchy including section, line and path.

Generally, a basic SONET frame (which is called the synchronous transport signal level-1 STS-1) is divided into an information payload, a path overhead (POH), a line overhead (LOH) and a section overhead (SOH). The payload is to be transported by the SONET system and is first mapped into a synchronous payload envelope (SPE). This operation is defined to be the path layer and is accomplished by using the path terminating equipment (PTE). Associated with the path layer are some additional bytes which are called the path overhead (POH) bytes, which are also placed into the SPE.

After the formation of the SPE, the SPE is placed into the frame along with some additional overhead bytes, which are called the line overhead (LOH) bytes. The LOH bytes are used to provide information for line protection and maintenance purposes. This LOH is created and used by the line terminating equipment (LTE).

The next layer is defined as the section layer. The section layer is used to transport the STS-N frame over a physical medium such as an optical fiber cable. Associated with the section layer are called the regenerator section overhead (SOH) bytes. The regenerator SOH bytes are used by the section terminating equipment (STE) for framing, section error monitoring, and section level equipment communications. The STE includes equipment which performs regeneration, and the regenerator terminates the regenerator SOH.

The SDH specification defines a more detailed layer hierarchy than that of the SONET specification. The transmission method and apparatus of the present invention does not directly relate to the detailed layer structure of the SDH specification, and a description thereof will be omitted.

In the transparent-transport SONET system of FIG. 1, a high-speed line layer is further defined. The SONET capabilities in the transparent-transport SONET system according to the invention are mapped into a four-layer hierarchy including section, high-speed line, line and path. The high-speed line layer is further defined as an additional intermediate layer between the section layer and the line layer. The HLTE is the high-speed line terminating equipment which corresponds to the 10-Gbps high-speed transmission apparatus of the present invention.

The high-speed line layer is used to transport the high-speed SDH frame (or the STS-N frame) between the transmit-side HLTE and the receive-side HLTE. Associated with the high-speed line layer are called the multiplex section overhead (SOH) bytes. The multiplex SOH bytes are created and used by the high-speed line terminating equipment (HLTE) for clock error adjusting, high-speed line error monitoring, and high-speed line level equipment communications. The line related signals, including the payload, the pointers and the line overhead LOH bytes, which are the lower-level signals from a viewpoint of the high-speed-line related signals, are passed through the HLTE without modifications. Hereinafter, the manner in which the line related signals are transported through the HLTE without modifications will be called the transparent transport.

In the transparent-transport SONET system of FIG. 1, when a high-speed SDH frame reaches the receive-side HLTE, the multiplex SOH bytes in the second SOH of the high-speed SDH frame are detected by the receive-side HLTE without changing the line overhead, the pointers and the payload, in order for high-speed line error monitoring and high-speed line level equipment communications. The multiplex SOH bytes in the second SOH of the high-speed SDH frame are generated by the transmit-side HLTE without changing the line overhead, the pointers and the payload before the high-speed SDH frame is transmitted by the transmit-side HLTE, in order for clock error adjusting, high-speed line error monitoring, and high-speed line level equipment communications. Accordingly, the transparent-transport SONET system of the present embodiment is effective in assuring the clock error adjusting and the high-speed line error monitoring when transmitting the low-speed SDH signals by using the high-speed SDH frame.

Figure 3A:
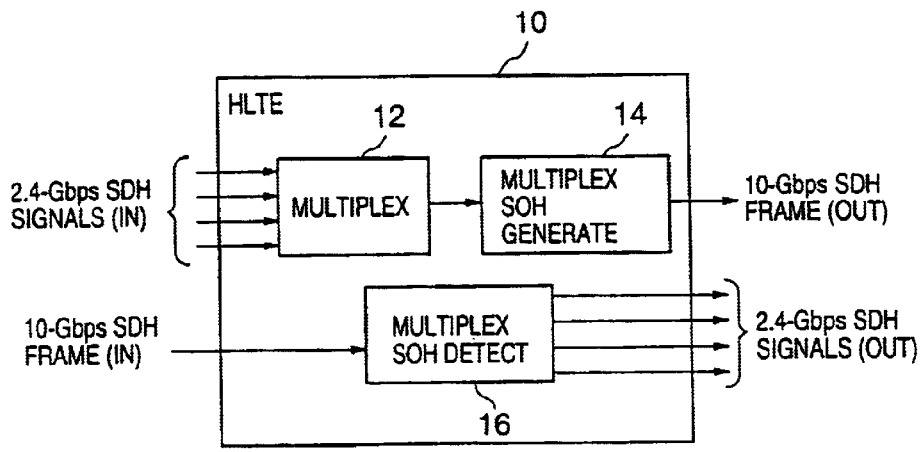
FIG. 3A and FIG. 3B are diagrams for explaining an operation of a high-speed line terminating equipment (HLTE) in the transparent-transport SONET system of the present embodiment.

FIG. 3A shows a configuration of the high-speed line terminating equipment (HLTE) in the transparent-transport SONET system of FIG. 1.

As shown in FIG. 3A, the HLTE 10 generally includes a multiplexer unit 12, a multiplex SOH generating unit 14, and a multiplex SOH detecting unit 16. The multiplexer unit 12 multiplexes low-speed (2.4 Gbps) SDH signals into a high-speed (10 Gbps) SDH frame, the high-speed SDH frame including an information payload, a line overhead and a section overhead, the section overhead being divided into a first section overhead SOH and a second section overhead SOH, the first SOH carrying regenerator SOH bytes and the second SOH carrying multiplex SOH bytes. The multiplex SOH detecting unit 16 detects the multiplex SOH bytes in the second SOH of the high-speed SDH frame without changing the line overhead and the payload when the high-speed SDH frame reaches the HLTE 10. The multiplex SOH generating unit 14 generates the multiplex SOH bytes in the second SOH of the high-speed SDH frame without changing the line overhead and the payload before the high-speed SDH frame is transmitted by the HLTE 10.

Figure 3B:
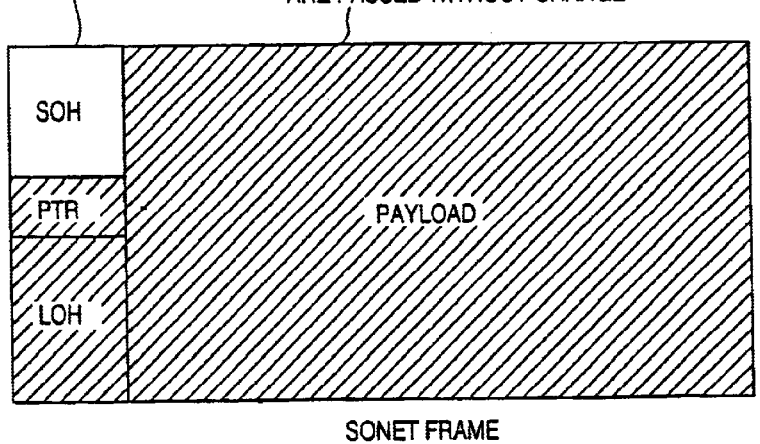

FIG. 3B shows a SONET frame for explaining an operation of the high-speed line terminating equipment (HLTE) in the transparent-transport SONET system of FIG. 1.

As shown in FIG. 3B, the multiplex SOH bytes related to the HLTE are allocated to unused or undefined bytes of the section overhead SOH of the SONET frame. The regenerator SOH bytes in the SONET frame remain unchanged. That is, in the SONET frame used by the transparent-transport SONET system of the present embodiment, a portion of the section overhead SOH is used for the regenerator SOH bytes in the SONET frame, and another portion of the SOH is used for the multiplex SOH bytes related to the high-speed line layer (HLTE). The AU (administration unit) pointers, the LOH bytes and the payload (including the path overhead POH) are passed through the HLTE without modifications. Hereinafter, the AU points, the LOH bytes and the payload are collectively called the line-related bytes. The line related bytes are the lower-level signals from a viewpoint of the high-speed-line related signals.

When the incoming clock is running faster than the outgoing clock at the HLTE in the transparent-transport SONET system of the present embodiment, a finite-size buffer inside the HLTE equipment will begin to fill up. Lack of the capacity of the buffer for storing the incoming signal will occur. On the other hand, when the outgoing clock is running faster than the incoming clock at the HLTE, the buffer inside the HLTE equipment will start emptying. Vacant bytes in the buffer of the HLTE will increase. In these cases, if a clock error between the 2.4-Gbps signal and the 10-Gbps signal at the HLTE is not negligible, the size of the low-speed line layer is not equal to one fourth the size of the high-speed line layer. Hence, the buffer inside the HLTE will begin to fill up or will start emptying.

In order to eliminate the above problem and ensure the clock error adjustment, the HLTE in the transparent-transport SONET system of the present embodiment adds stuffing bytes to the multiplex SOH of the SONET frame when multiplexing the 2.4-Gbps low-speed SDH signals of four channels into the 10-Gbps high-speed SDH frame.

Figure 4:
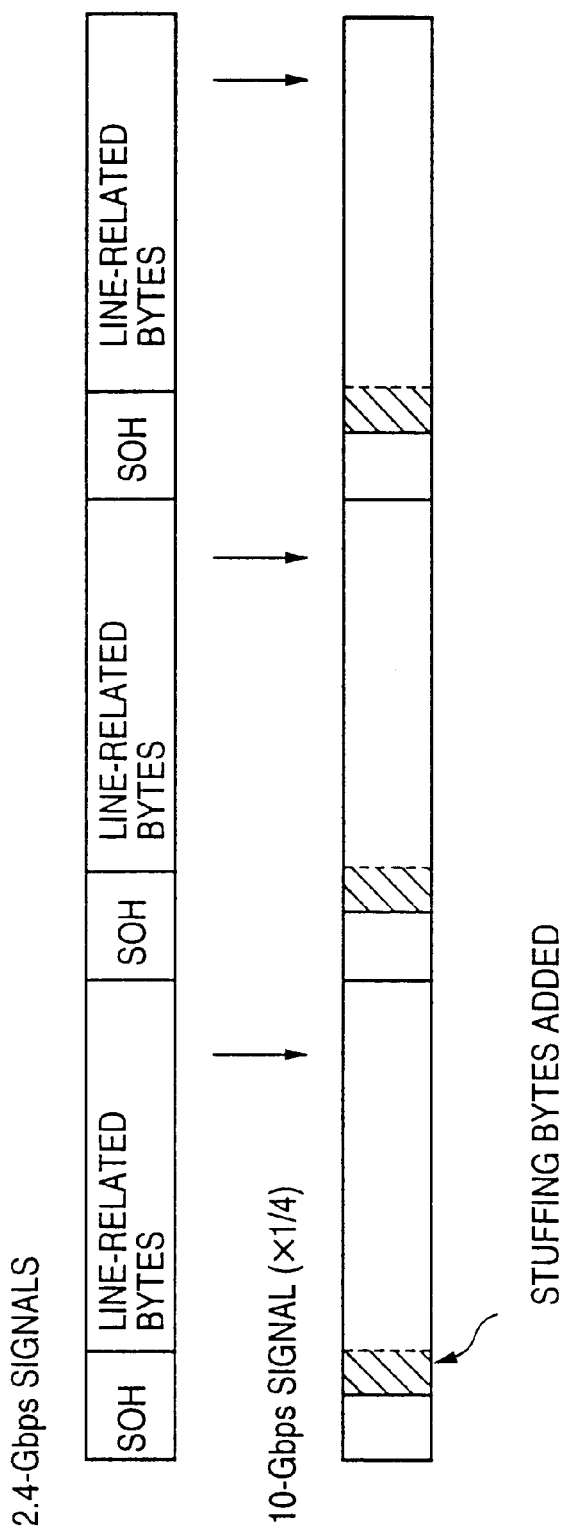
FIG. 4 is a diagram for explaining stuffing bytes which are allocated into section overhead bytes of a SONET frame by the transparent-transport SONET system of the present embodiment.

FIG. 4 shows stuffing bytes which are added to the multiplex section overhead bytes of the SONET frame by the HLTE of the transparent-transport SONET system of FIG. 1.

As indicated by the shaded lines in FIG. 4, the high-speed line terminating equipment (HLTE) in the present embodiment adds the stuffing bytes to the multiplex SOH bytes of the SONET frame when multiplexing the four 2.4-Gbps low-speed SDH signals (only three signals shown in FIG. 4, for the sake of convenience) into the 10-Gbps high-speed SDH frame. The addition of the stuffing bytes ensures the clock error adjustment even if a clock error occurs at the HLTE. In the case of FIG. 4, the regenerator SOH bytes of the SONET frame for each of the four 2.4-Gbps low-speed SDH signals remain unchanged, and the multiplex SOH bytes are located at the undefined bytes of the section overhead of the SONET frame.

When there is a clock error between the 2.4-Gbps signals and the 10-Gbps signal, the position of the start of each of the low-speed SDH signals is likely to deviate from the desired position in the high-speed SDH frame, the amount of the deviation depending on the magnitude of the clock error. In such a case, it is difficult to locate the start of each of the low-speed SDH signals in the high-speed SDH frame. To avoid this, it is necessary to insert any frame sync signal into each of the low-speed SDH frames before mapping them into the high-speed SDH frame. When the high-speed SDH frame containing such stuffing bytes is received, it is necessary to remove the stuffing bytes of the high-speed SDH frame and establish the frame synchronization between the individual 2.4-Gbps signals in demultiplexing the high-speed SDH frame into the low-speed SDH signals.

The transmission method and apparatus of the present invention can eliminate the need for the stuffing byte removal and frame synchronization operations. The transparent-transport SONET system of FIG. 1 utilizes a pointer processing which eliminates the need for the stuffing byte removal and frame synchronization operations.

The pointer used by the transparent-transport SONET system of the present embodiment indicates the start of one of the low-speed SDH signals relative to the start of the entire high-speed SDH frame. The stuffing byte removal and frame synchronization of the low-speed SDH signals at the receive-side HLTE is no longer needed because of the pointer processing.

Figure 5A:
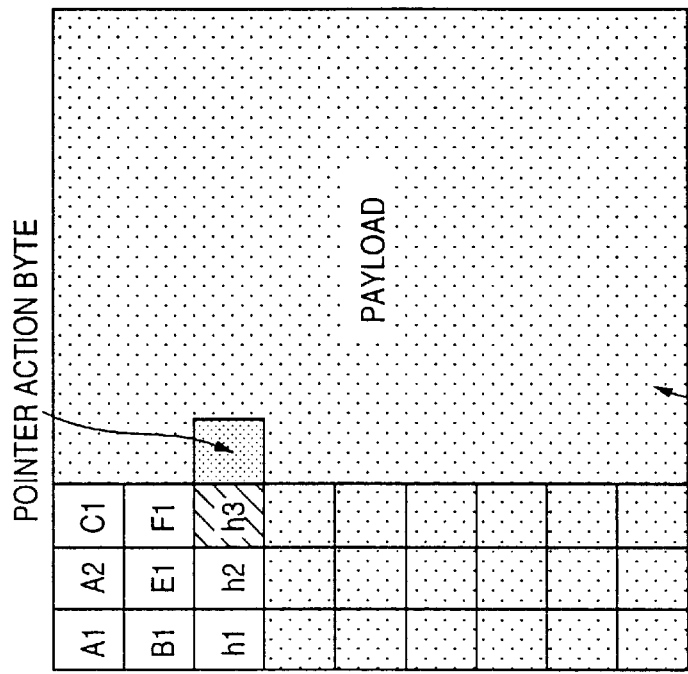
FIG. 5A and FIG. 5B are diagrams for explaining a normal pointer processing of the conventional SONET system and a pointer processing of the transparent-transport SONET system of the present embodiment.
Figure 5B:
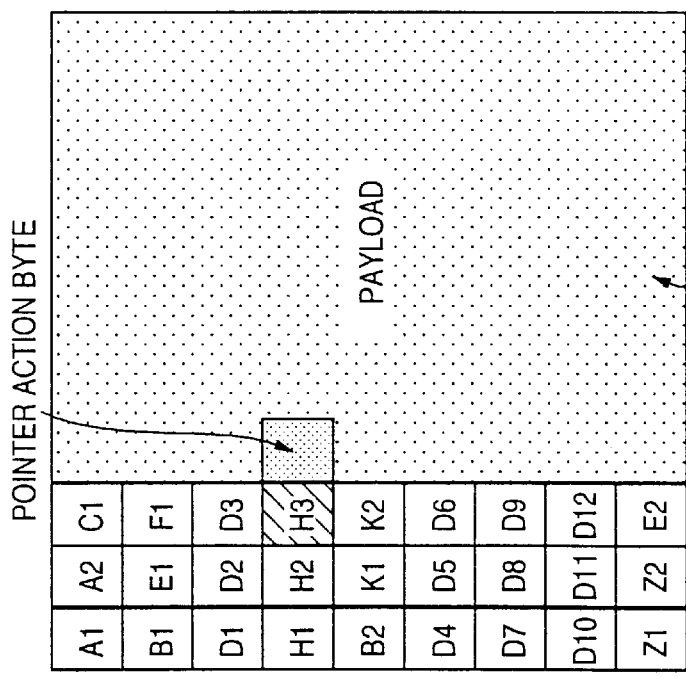

FIG. 5A and FIG. 5B show a normal pointer processing of a conventional SONET system and a pointer processing of the transparent-transport SONET system of the present embodiment.

As shown in FIG. 5A, the normal pointer processing of the conventional SONET system is performed by using the AU (administration unit) pointer bytes (H1, H2 and H3) in the section overhead of the conventional SONET frame. The normal pointer processing performed using the AU pointer bytes H1, H2 and H3 is known. The pointer bytes H1 and H2 contain a pointer value which indicates a start position of the payload in the SONET frame. The pointer byte H3 in the SOH of the SONET frame serves as a pointer action byte which is used for the normal pointer processing. The payload bytes indicated by the dotted area in FIG. 5A are passed without modification by the normal pointer processing.

As shown in FIG. 5B, the pointer processing of the transparent-transport SONET system of the present embodiment is performed using by the pointer bytes (h1, h2 and h3) based on the basic frame structure of either the STS-12 frame or the STM-4 frame. These pointer bytes h1, h2 and h3 lie in the multiplex SOH of the SONET frame of FIG. 5B, and the locations of the pointer bytes h1, h2 and h3 correspond to the positions of the section data communications channel (SDCC) bytes (D1, D2 and D3 indicated in FIG. 5A) of the section overhead of the conventional SONET frame of FIG. 5A. The pointer processing of the transparent-transport SONET system of the present embodiment is performed with the pointer bytes h1, h2 and h3, in the same manner as that of the normal pointer processing which is performed using the AU pointer bytes H1, H2 and H3. The line overhead and payload bytes indicated by the dotted area in FIG. 5B are passed without modification by the pointer processing of the present embodiment.

As described above, according to the pointer processing of the present embodiment, the pointer bytes h1, h2 and h3 in the SONET frame of FIG. 5B may collide with the section data communications channel (SDCC) bytes D1, D2 and D3 in the section overhead of the conventional SONET frame of FIG. 5A. However, in a case of the 10-Gbps SDH signal (OC-192 or STS-192), the SDCC bytes are contained only in a first-channel 2.4-Gbps STS-48 signal derived from the 10-Gbps SDH signal. The subsequent-channel STS-48 signals derived from the 10-Gbps SDH signal do not contain the SDCC bytes, and the pointer bytes h1, h2 and h3 do not collide with the SDCC bytes in the section overheads of the subsequent-channel STS-48 signals. If the collision of the pointer bytes h1, h2 and h3 with the SDCC bytes in the section overhead of the first-channel low-speed SDH signal is considered negligible, this makes it possible that the subsequent-channel low-speed SDH signals, the size of which is three fourths the size of the entire high-speed SDH frame, be transported in a transparent manner.

In the SONET specification, a clock frequency error of ±20 ppm between the incoming clock and the outgoing clock at a network element is allowed. Hence, the allowed clock frequency error between two network elements is ±40 ppm. If the SONET STS-48 frame is considered the low-speed SDH signal, a total number of the line-related bytes contained in the STS-48 frame amounts to 38,448 bytes (=801×48). In the HLTE of the transparent-transport SONET system of the present embodiment, the number of the stuffing bytes which are added to the multiplex SOH of the SONET frame is set to 2 bytes per frame. In order to ensure the clock error adjustment, it is needed for the HLTE of the transparent-transport SONET system of the present embodiment to make the number of the stuffing bytes larger than a product (=1.54 bytes) of the allowed clock frequency error (±40 ppm) and the total number (38,448 bytes) of the line-related bytes contained in one of the low-speed SDH signals.

Figure 6:
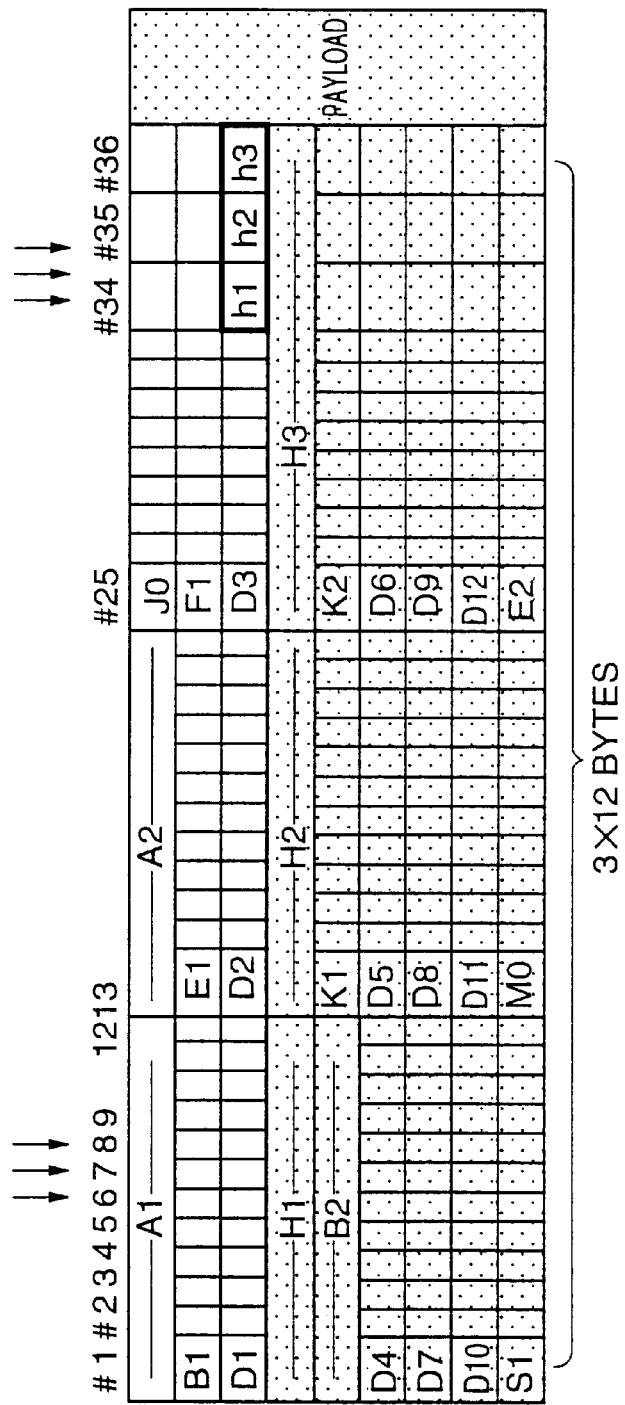
FIG. 6 is a diagram for explaining an allocation of section overhead bytes in a first-channel STS-12 frame in the present embodiment.
Figure 7:
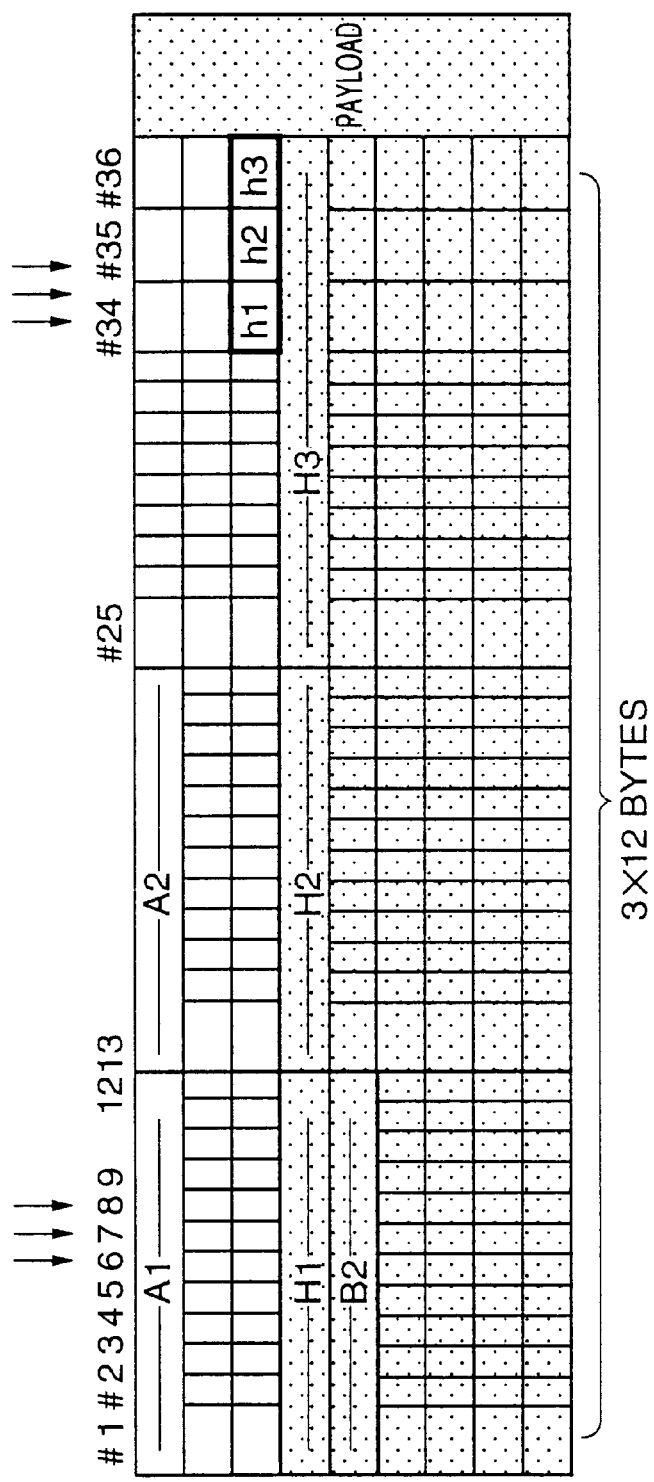
FIG. 7 is a diagram for explaining an allocation of section overhead bytes in a subsequent-channel STS-12 frame in the present embodiment.

FIG. 6 shows an allocation of section overhead bytes in a first-channel STS-12 signal in the present embodiment. FIG. 7 shows an allocation of section overhead bytes in a subsequent-channel STS-12 signal in the present embodiment.

Suppose that the STS-12 frame is taken as a basic SDH frame structure. In this case, the number of the stuffing bytes added for each of the low-speed SDH signals (STS-12) is set to 1 byte per frame. In a case of the STS-48 frame, the number of the stuffing bytes added for each of the low-speed SDH signals (STS-48) is set to 4 bytes per frame. The allocations of the section overhead bytes shown in FIG. 6 and FIG. 7 are based on the basic SDH frame structure of the STS-12 frame.

As shown in FIG. 6 and FIG. 7, the stuffing bytes h1, h2 and h3 are allocated at the 34th, 35th and 36th columns in the section overhead of the STS-12 frame., the positions of which correspond to the positions of the SDCC bytes (D1, D2 and D3 indicated in FIG. 5A) of the section overhead of the conventional SONET frame. Only in the section overhead of the first-channel STS-12 signal of FIG. 6, the basic regenerator SOH bytes, such as B1, E1 or F1, are allocated. However, in the section overhead of the subsequent-channel STS-12 signal of FIG. 7, most of the basic regenerator SOH bytes are omitted except the regenerator SOH bytes A1 and A2.

FIG. 8A and FIG. 8B show a normal pointer value setting of the conventional SONET system and a pointer value setting of the transparent-transport SONET system of the present embodiment.

The normal pointer value setting of FIG. 8A is given for the purpose of comparison with the pointer value setting of the present embodiment. As shown in FIG. 8A, the pointer in the STS-1 frame consists of 10 bits and the pointer value ranges from 0 to 782 according to the normal pointer value setting. The initial pointer value is equal to 522. The pointer action byte is the H3 byte in the AU pointer bytes of the STS-1 frame. The pointer value 0 indicates the start of the STS-1 frame which is located following the position of the H3 byte.

As shown in FIG. 8B, according to the pointer value setting of the transparent-transport SONET system of the present embodiment, the pointer in the STS-12 frame consists of 14 bits and the pointer value ranges from 0 to 9611. The initial pointer value is equal to 7524. The pointer action byte is the h3 byte in the multiplex SOH bytes of the STS-12 frame. The pointer value 0 indicates the start of the STS-12 frame which is located following the position of the h3 byte (the pointer action byte).

As described above, 14 bits out of 16 bits of the h1 and h2 bytes in the multiplex SOH of the STS-12 frame are allocated to represent the pointer value. Further, according to the pointer value setting of the transparent-transport SONET system of the present embodiment, the remaining 2 bits of the h1 and h2 bytes in the multiplex SOH of the STS-12 frame are allocated to indicate whether the correct pointer value is input to the multiplex SOH of the STS-12 frame.

Figure 9:
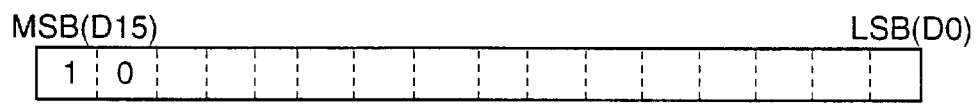
FIG. 9 is a diagram for explaining a pointer value checking of the transparent-transport SONET system of the present embodiment.

FIG. 9 shows a pointer value checking of the transparent-transport SONET system of the present embodiment.

As shown in FIG. 9, the two most-significant bits (MSB) in the h1 and h2 bytes in the multiplex SOH of the STS-12 frame are used for the purpose of pointer value checking. These bits are called the pointer value checking (PVC) bits. When the correct pointer value is input, the PVC bits are set to "10" (alternatively, they may be set to "01"). Otherwise the PVC bits are set to a different value. Therefore, the transparent-transport SONET system of the present embodiment can make a determination as to whether the correct pointer value is input to the h1 and h2 bytes (the pointer) of the multiplex SOH of the high-speed SDH frame, by detecting the PVC bits in the multiplex SOH of the high-speed SDH frame. In the SONET frame, the undefined bytes are initially set to all "0", and in the SDH frame, the undefined bytes are initially set to all "1". Hence, it is necessary that the value to which the PVC bits are set differ from the default value of such undefined bytes.

In the transparent-transport SONET system of the present embodiment, the 2.4-Gbps low-speed SDH signals of four channels are mapped into the 10-Gbps high-speed SDH frame. However, all of the low-speed SDH signals of the four channels are not transported in a transparent manner. Generally, a simple demultiplexing of the 10-Gbps SDH signal (the STS-192) creates four groups of low-speed SDH signals: first channels 1–48; second channels 49–96; third channels 97–144; and fourth channels 145–192. However, this allocation of channels is not in conformity with that of an existing optical transmission ring network.

Figure 10:
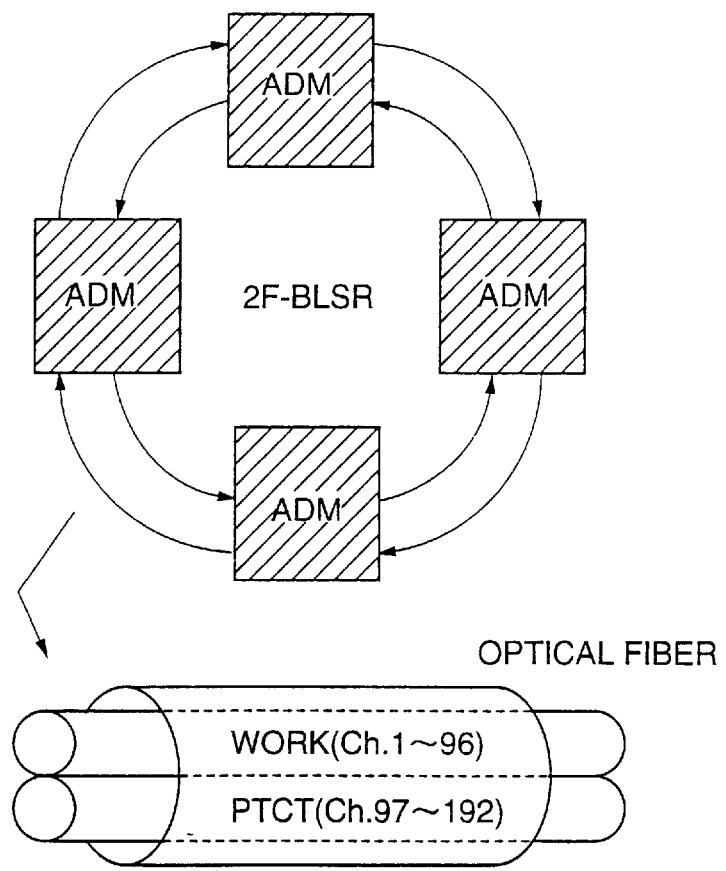
FIG. 10 is a diagram for explaining an allocation of working and protection channels in an optical-fiber cable of an optical transmission ring network.
Figure 12:
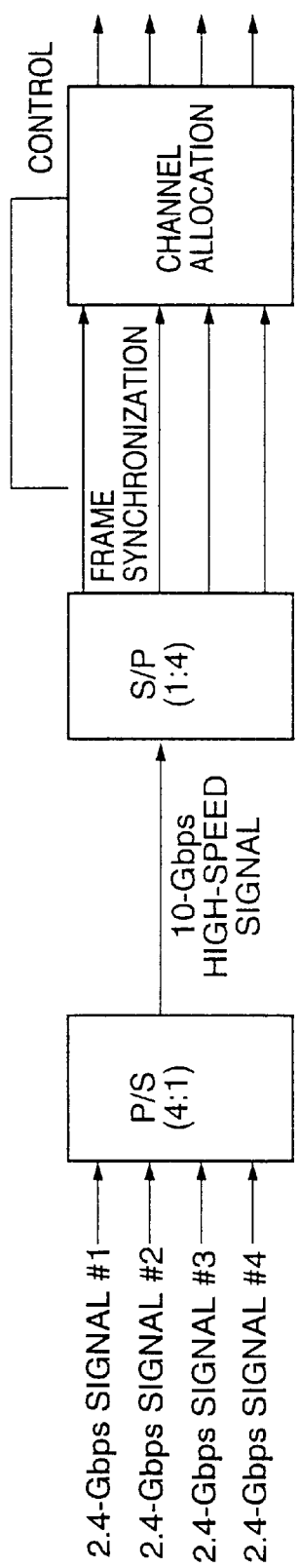
FIG. 12 is a diagram for explaining a multiplexing of four 2.4-Gbps data signals into a 10-Gbps signal and a demultiplexing of the 10-Gbps signal.
Figure 13:
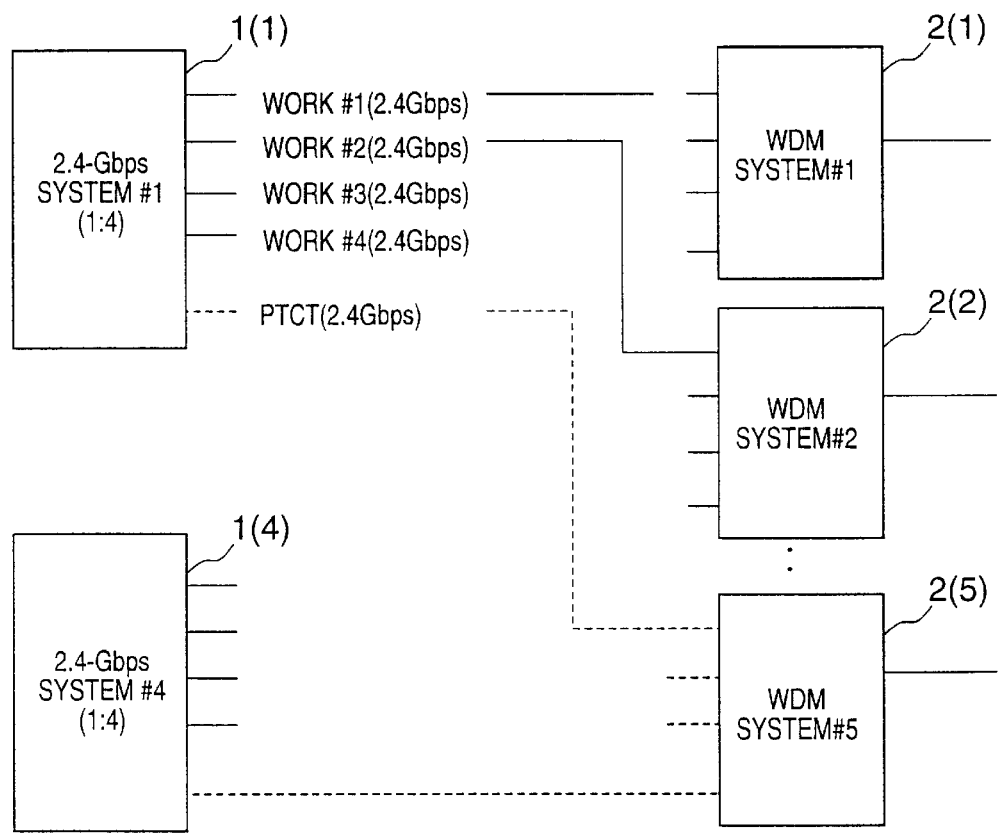
FIG. 13 is a diagram showing a configuration of high-speed WDM systems which are connected to low-speed electrical multiplexed systems via working and protection optical-fiber cables.
Figure 14:
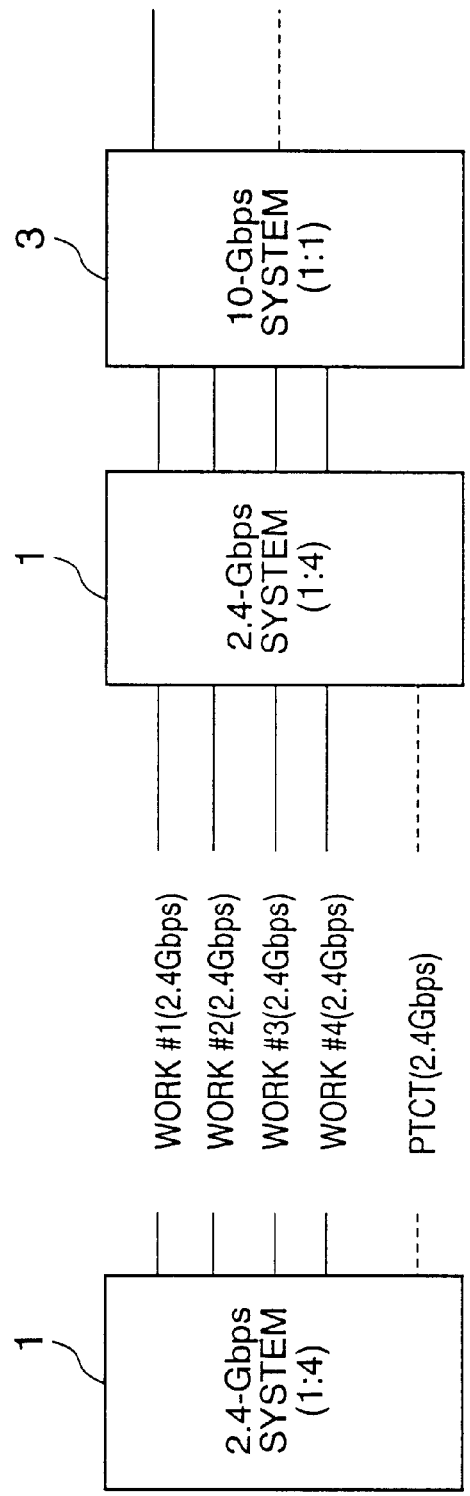
FIG. 14 is a diagram showing a configuration of a high-speed electrically-multiplexed system which is connected to a low-speed electrically-multiplexed system.
Figure 15:
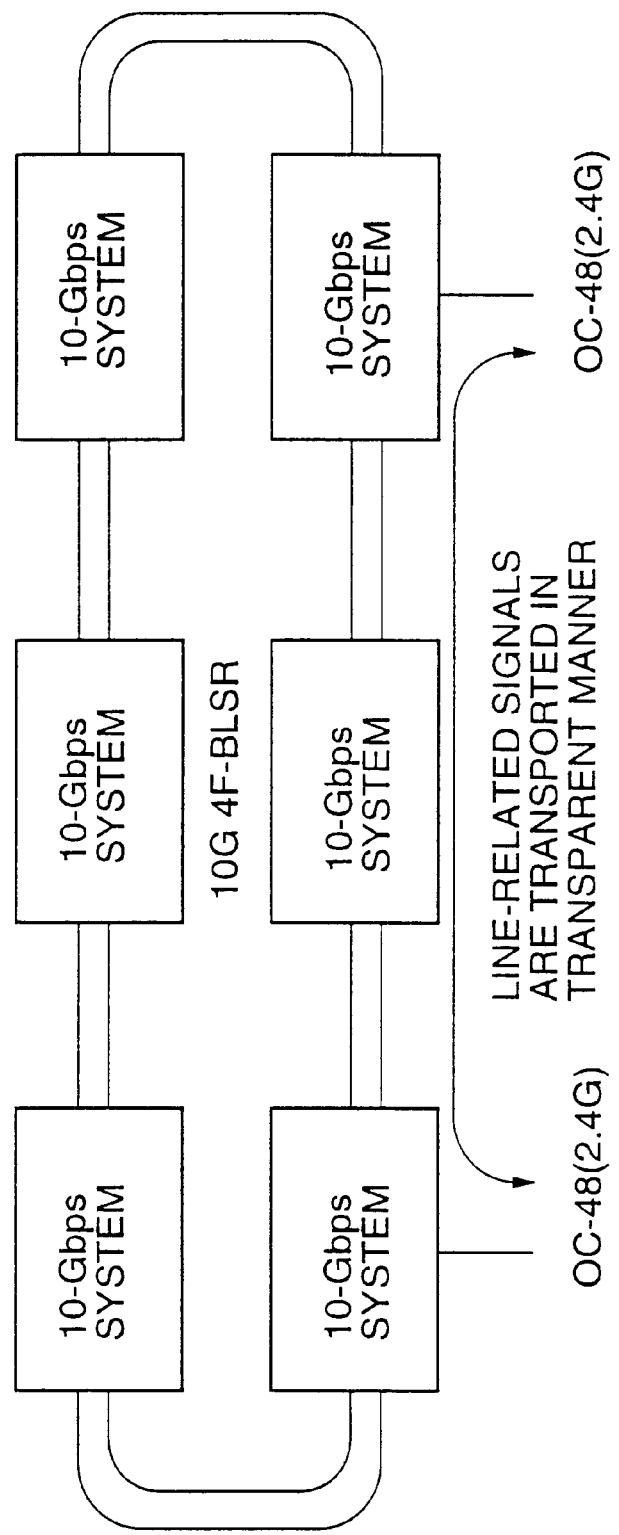
FIG. 15 is a diagram showing an optical transmission ring network in which high-speed transmission devices and low-speed transmission devices coexist.

FIG. 10 shows an allocation of working and protection channels in an optical-fiber cable of an optical transmission ring network.

The ring network of FIG. 10 is 2F-BLSR (2 fiber bidirectional line switched ring) provided in GR-1230-CORE, Issue 3, December 1996. In the ring network of FIG. 10, the allocation of channels is made according to the GR-1230 standard in such a manner that the channels 1–96 are the working channels (WORK) while the channels 97–192 are the protection channels (PTCT). Therefore, the allocation of channels made by the simple demultiplexing of the high-speed SDH frame is not in conformity with the allocation of channels defined by the ring network of FIG. 10.

In order to eliminate the above problem, the transparent-transport SONET system of the present embodiment utilizes a modified allocation of channels which is made based on the allocation defined by the GR-1230 ring network shown in FIG. 10.

FIG. 11 shows a modified allocation of working and protection channels in an optical-fiber cable of the transparent-transport SONET system of the present embodiment.

As shown in FIG. 11, in the transparent-transport SONET system of the present embodiment, the 192 channels are divided into eight 24-channel groups. The modified allocation of channels is made according to the present embodiment in such a manner that the channels 1–24, 49–72, 97–120, and 145–168 are the working channels (WORK) while the channels 25–48, 73–96, 121–144, and 169–192 are the protection channels (PTCT). By using the modified channel allocation, the network structure according to the transparent-transport SONET system of the present embodiment is applicable to 2F-BLSR or UPSR. Further, even in a case of LTE equipment, the transmission method and apparatus of the present invention is applicable.

When the modified channel allocation described above is used, the SDH signals of the 192 channels are transported on a signal optical-fiber cable, and the failure recovery capability of the transparent-transport SONET system of the present embodiment is not influenced. Further, any combination of the channel allocation made by the simple demultiplexing, the channel allocation defined by the ring network of FIG. 10, and the modified channel allocation can be made so as to suit the practical network applications.

The present invention is not limited to the above-described embodiments, and variations and modifications may be made without departing from the scope of the present invention.

Further, the present invention is based on Japanese priority application No.11-073,627, filed on Mar. 18, 1999, the entire contents of which are hereby incorporated by reference.

What is claimed is:

1. A transmission method which transmits low-speed SDH signals using a high-speed SDH frame, the transmission method comprising the steps of:

multiplexing the low-speed SDH signals into the high-speed SDH frame, the high-speed SDH frame including an information payload, a line overhead and a section overhead, the section overhead being divided into a first section overhead SOH and a second section overhead SOH, the first SOH carrying regenerator SOH bytes and the second SOH carrying multiplex SOH bytes;

generating the multiplex SOH bytes in the second SOH of the high-speed SDH frame without changing the line overhead and the payload before the high-speed SDH frame is transmitted by a transmit-side high-level line terminating equipment;

wherein said generating step includes adding stuffing bytes to the second SOH of the frame when the high-speed SDH frame is generated, the stuffing bytes being larger in number than a product of an allowed clock frequency error and a total number of line-related bytes contained in one of the low-speed SDH signals; and detecting the multiplex SOH bytes in the second SOH of the high-speed SDH frame without changing the line overhead and the payload when the high-speed SDH frame reaches a receive-side high-level line terminating equipment.

2. The transmission method according to claim 1, wherein the multiplex SOH bytes in the second SOH of the high-speed SDH frame constitute a pointer which indicates a start of one of the low-speed SDH signals relative to a start of the entire high-speed SDH frame.

3. The transmission method according to claim 2, wherein a pointer processing is performed with the pointer based on a basic frame structure of one of a STS-12 frame or a STS-4 frame.

4. The transmission method according to claim 3, wherein the pointer consists of 14 bits, and a pointer value indicated by the pointer ranges from 0 to 9611, the pointer value 0 indicating a start position of the payload in the high-speed SDH frame, which is located following a position of a pointer action byte in the payload.

5. The transmission method according to claim 4, wherein the second SOH of the high-speed SDH frame includes two bytes which consists of 16 bits, 14 bits contained in the two bytes being allocated to represent the pointer value, and remaining 2 bits in the two bytes being allocated to indicate whether a current pointer value is input to the second SOH of the high-speed SDH frame.

6. The transmission method according to claim 5, wherein the remaining 2 bits in the two bytes of the second SOH of the high-speed SDH frame are set to one of "10" or "01" when the correct pointer value is input to the 14 bits in the second SOH.

7. The transmission method according to claim 1, wherein an allocation of working and protection channels in an optical-fiber cable of an optical transmission ring network is modified to be in conformity with an allocation of channels made by a demultiplexing of the high-speed SDH frame.

8. A transmission apparatus which transmits low-speed SDH signals using high-speed SDH frames, comprising:

a multiplexer unit which multiplexes the low-speed SDH signals into a first high-speed SDH frame, the first high-speed SDH frame including an information payload, a line overhead and a section overhead, the section overhead being divided into a first section overhead SOH and a second section overhead SOH, the first SOH carrying regenerator SOH bytes and the second SOH carrying multiplex SOH bytes;

a multiplex SOH generating unit which generates the multiplex SOH bytes in the second SOH of the first high-speed SDH frame without changing the line overhead and the payload before the first high-speed SDH frame is transmitted by the transmission apparatus;

wherein said multiplex SOH generating unit causes stuffing bytes to be added to the second SOH of the first high-speed SDH frame when the first high-speed SDH frame is generated, the stuffing bytes being larger in number than a product of an allowed clock frequency error and a total number of line-related bytes contained in one of the low-speed SDH signals; and a multiplex SOH detecting unit which detects multiplex SOH bytes in a second SOH of a second high-speed SDH frame without changing a line overhead and a payload of the second high-speed SDH frame when the second high-speed SDH frame reaches the transmission apparatus.

\* \* \* \* \*